(12) United States Patent
Mathews (10) Patent No.: US 6,801,848 B1
(45) Date of Patent: Oct. 5, 2004

(54) METHODS AND APPARATUS FOR SENSING MISFIRE IN AN INTERNAL COMBUSTION ENGINE

(75) Inventor: David S. Mathews, Howell, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/602,376

(22) Filed: Jun. 25, 2003

(51) Int. Cl.$^7$ ............................................. G01M 15/00
(52) U.S. Cl. .................... 701/111; 701/114; 123/406.14
(58) Field of Search ................................ 701/111, 110, 701/114, 102; 123/406.13, 406.14, 406.24, 406.27

(56) References Cited

U.S. PATENT DOCUMENTS

| | | | | |
|---|---|---|---|---|
| 4,893,244 A | * | 1/1990 | Tang et al. ................. | 701/110 |
| 5,237,862 A | * | 8/1993 | Mangrulkar et al. .......... | 73/116 |
| 5,307,670 A | * | 5/1994 | Imai et al. ................. | 73/117.3 |
| 6,520,159 B2 | * | 2/2003 | White et al. ................ | 123/481 |

* cited by examiner

*Primary Examiner*—Hieu T. Vo
(74) *Attorney, Agent, or Firm*—Christopher DeVries (57) ABSTRACT

Methods and apparatus are provided for sensing a misfire in an engine having at least one cylinder and for providing a misfire indication signal in response to the occurrence of the misfire. The apparatus comprises an electronic controller that calculates an expected time period for a cylinder event during which fuel is combusted in a cylinder to provide an expected time period value. The time period of the cylinder event is measured to provide a measured time period value. The difference between the expected time period value and the measured time period value is calculated to provide a difference time period value. The difference time period value is compared to a predetermined threshold time. The misfire indication signal is provided in response to the difference time period value exceeding the predetermined threshold time.

21 Claims, 5 Drawing Sheets

METHODS AND APPARATUS FOR SENSING MISFIRE IN AN INTERNAL COMBUSTION ENGINE

FIELD OF THE INVENTION

The present invention generally relates to reliably sensing misfire in a cylinder of an engine, and more particularly relates to methods and apparatus for also accurately indicating repeated misfires to an operator of the engine and for identifying which of the cylinders is misfiring.

BACKGROUND OF THE INVENTION

Governmental agencies require modern internal combustion engines being used for a variety of purposes to provide warnings to an operator of the engine when a cylinder or cylinders thereof repeatedly misfire. The misfire can be caused by either an improper fuel-to-air mixture due to a faulty fuel injector or by an inadequate amount of spark energy caused by a faulty spark plug, for instance. Such warning indication is usually in the form of a light that is activated in response to a warning signal from a misfire sensing system or apparatus associated with the engine. The misfire sensing apparatus is also required to facilitate engine repairs by recording and providing to a service technician the identity of the cylinder or cylinders that initiated the warning.

A misfire results in incomplete combustion of the fuel and air mixture in a cylinder which causes a fuel rich gas to be outputted by the engines of automobiles for example, into catalytic converters. Precious metals utilized in such converters facilitate further chemical burning of the fuel rich gas resulting from the misfire so that these gases are consequently cleaned before being exhausted from the converters into the ambient atmosphere. Such converters can properly process only a limited amount of such incompletely combusted gas before being destroyed. The repetition of a nearly complete lack of combustion by a misfiring cylinder of an engine experiencing either a heavy load or a high rotational speed can output an air-to-fuel mixture so rich in fuel that the mixture will destroy a catalytic converter in a short time. A misfire also results in a reduction in the torque being delivered by the misfiring cylinder to a crankshaft being driven by the cylinder. Thus it important that the conditions causing misfiring be quickly corrected in response to the warning indication to help maintain engine power, preserve air quality and to avoid costly repairs.

Some prior art misfire sensing systems utilize gears driven by the crankshafts to indicate misfires. The gear includes precisely formed teeth for alternately affecting the flow of magnetic flux through a magnetic sensor as the crankshaft turns the gear. Consequently, the sensor provides an electrical pulse for each selected amount of crank angle of the crankshaft. The misfire sensing system measures the time periods between successive pulses generated by the magnetic sensor for each cylinder combustion event. The reduced torque associated with misfire causes the time period corresponding to the misfiring cylinder combustion event to increase relative to the cylinder combustion event time periods of the non-misfiring cylinders. The time periods of the cylinder combustion events for each of the cylinders are compared with each other. It is desired that this comparison help determine the occurrence of the misfire and help identify which cylinder or cylinders are misfiring by identifying which cylinder or cylinders have combustion event time periods that are long enough to indicate a misfire. The misfire warning signal is generated in response to the occurrence of a number of misfires sufficient to verify that a misfiring problem exists. Also, known misfire sensing systems learn the Crank Angle Sensing Error (CASE) due to differences between the individual teeth of the gear to thereby increase the signal-to-noise ratios of such misfire indication signals.

The rotational speed of an engine is measured in Revolutions per Minute (RPM). The RPM of the engine and thus the cylinder combustion event time periods used for the foregoing misfire determinations by the previously described prior art misfire sensing apparatus are subject to significant changes due to various factors other than misfire. Such factors include transient or temporary influences on the engine from the drive train of a vehicle driving on a rough road, for instance. Moreover it is also difficult for some prior art misfire systems to determine misfire when the engine is at idle. This is because the engine controller adjusts the engine parameters over wide ranges in an attempt to maintain a constant RPM at idle even though the load on the engine changes because of the activation and deactivation of various systems such as air conditioning or electric windows. Such varying loads affect the cylinder combustion event time periods. Detection of misfire by some prior art systems becomes more troublesome as the number of cylinders of an engine increases because each cylinder combustion event becomes shorter for a given engine RPM as the number of cylinders increases. The shorter time periods tends to create erroneous results in prior art systems having low signal-to-noise ratios because there is less available time to ascertain each misfire.

Furthermore, some prior art misfire sensing apparatus have too much sensitivity, which results in erroneous misfire warnings. Alternatively, other prior art systems have too little sensitivity, which results in no misfire warning even though the engine is misfiring. The erroneous warnings or the lack of valid warnings undesirably cases an unacceptable number of newly manufactured engines to not pass test procedures relating to detection of misfiring.

In view of foregoing, it should be appreciated that there is a need to provide improved methods and apparatus for robustly detecting cylinder misfire, providing a warning signal in response to a sufficient number of misfires and identifying the misfiring cylinder or cylinders. There is also a need to provide misfire sensing systems that have high misfire signal-to-noise ratios so that the sensitivity tolerance can be kept within manageable limits. Moreover, it is desirable to not provide false warning alerts to the operators of such engines. Such methods and apparatus are required to operate in an improved manner at engine idle and over both large and transient variations of RPM. It is also desirable for such improvements to be accomplished by using information already being provided by the engine controller for other purposes rather than by providing additional expensive hardware. Moreover, it is advantageous for such methods and apparatus to be suitable for use with engines having a relatively high numbers of cylinders. Furthermore, other desirable features and characteristics of the present invention will become apparent from the subsequent brief summary, detailed description, appended claims and abstract taken in conjunction with the accompanying drawings and this background of the invention.

BRIEF SUMMARY OF THE INVENTION

In accordance with an exemplary embodiment of the present invention, methods and apparatus are provided which operate with an engine having at least one cylinder for sensing a misfire and providing a misfire indication signal. The apparatus comprises an electronic engine controller that calculates an expected time period value for a cylinder event during which fuel is combusted in a cylinder. The actual time period of the cylinder combustion event is also measured to provide a measured time period value. The difference between the expected time period value and the measured time period value is calculated to provide a difference time period value. The difference time period value is compared to a predetermined threshold time. The misfire indication signal is provided in response to the difference time period value exceeding the predetermined threshold time.

BRIEF DESCRIPTION OF THE DRAWINGS

The present invention will hereinafter be described in conjunction with the appended drawing figures, wherein like reference numbers denote like elements.

DETAILED DESCRIPTION OF THE INVENTION

The following detailed description is merely exemplary in nature and is not intended to limit the scope of the invention or the application and uses of the invention. Furthermore, there is no intention to be bound by any theory presented in the preceding background of the invention or the following detailed description.

Figure 1:
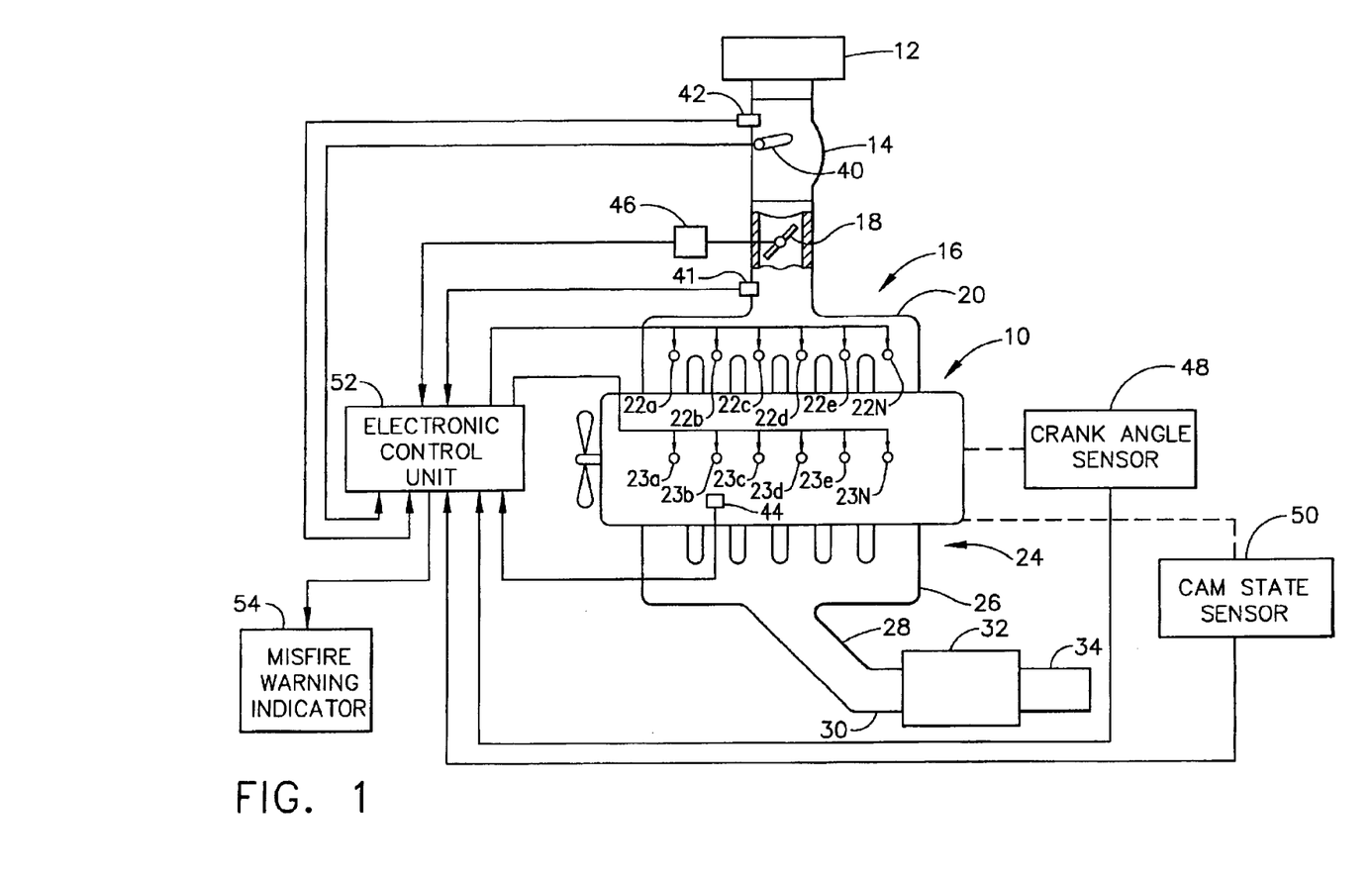
FIG. 1 is a schematic diagram of a vehicle engine having an apparatus for detecting engine misfire in accordance with an exemplary embodiment of the present invention.

FIG. 1 illustrates an internal combustion engine 10 equipped with a misfire sensing and indicating apparatus in accordance with principles of the invention. More specifically, engine 10 can be a four-cycle engine that is adaptable for many purposes such as powering an automobile, a boat, an airplane or an electrical generator Engine 10 can have any number of cylinders, N where N is a number that is equal to or greater than one.

For purposes of the following discussion, engine 10 is assumed to be installed in a motor vehicle. An air cleaner 12 is attached to an end of input portion 14 of an intake manifold 16 that is affixed to the block of engine 10. A throttle valve 18 is placed in intake manifold input portion 14 for adjusting the amount of intake air drawn into the cylinders of engine 10 through a path including air cleaner 12, intake manifold input portion 14 and intake manifold output portion 20. A plurality of fuel injectors 22a through 22N are mounted in intake manifold output portion 20 for injecting precisely controlled amounts of fuel into each of the respective cylinders corresponding thereto. In addition, a plurality of spark plugs 23a through 23N and associated coils are employed by engine 10 to provide precisely controlled amounts of spark energy into each of the respective cylinders corresponding thereto. An exhaust manifold 24 includes input portions 26 which are connected to each cylinder to channel exhaust gases through exhaust manifold output portion 28 which is connected through pipe 30 to an input of a catalytic converter 32. Exhaust pipe 34 is connected to the output of converter 32. Ideally, converter 32 removes the fuel and other undesirable ingredients from the gases exiting from each of the cylinders. Exhaust pipe 34 discharges the resulting output gases of converter 32 into the ambient atmosphere.

Several sensors are employed to monitor various parameters that are used to operate engine 10. These sensors are also used to detect misfire in accordance with an embodiment of the invention. An intake air flow (mass/time) sensor 40 is mounted in manifold input portion 14 for sensing the instantaneous flow of air being sucked into manifold 16 by the cylinders. Sensor 40 generates an output signal having a magnitude corresponding to the mass of incoming air. Sensor 40 is useful for detecting misfire at a constant RPM. Additionally, an intake air pressure sensor 41 is mounted in input portion 14 for sensing the instantaneous pressure of the incoming air and providing a signal having a magnitude representative thereof. Sensor 41 facilitates misfire detection during transient load changes when accurate sensing of the incoming air pressure is particularly needed. Also, an intake air temperature sensor 42 is mounted in input portion 14 for sensing the temperature of the incoming air and generating a signal having a magnitude indicative of such temperature. An engine temperature sensor 44 is mounted on engine 10 and provides a signal representative of the temperature of the engine coolant. Throttle sensor 46 generates a throttle position signal indicative of the position of valve 18 which generally is opened and closed in response to the position of an accelerator (not shown) that is controlled by an operator (not shown) of engine 10. The throttle position signal also helps to indicate the amount of air flow through manifold 16 and to identify when engine 10 is operated in an idle mode during which the air and spark are adjusted to maintain engine operation at a constant RPM by known feedback techniques.

Figure 4:
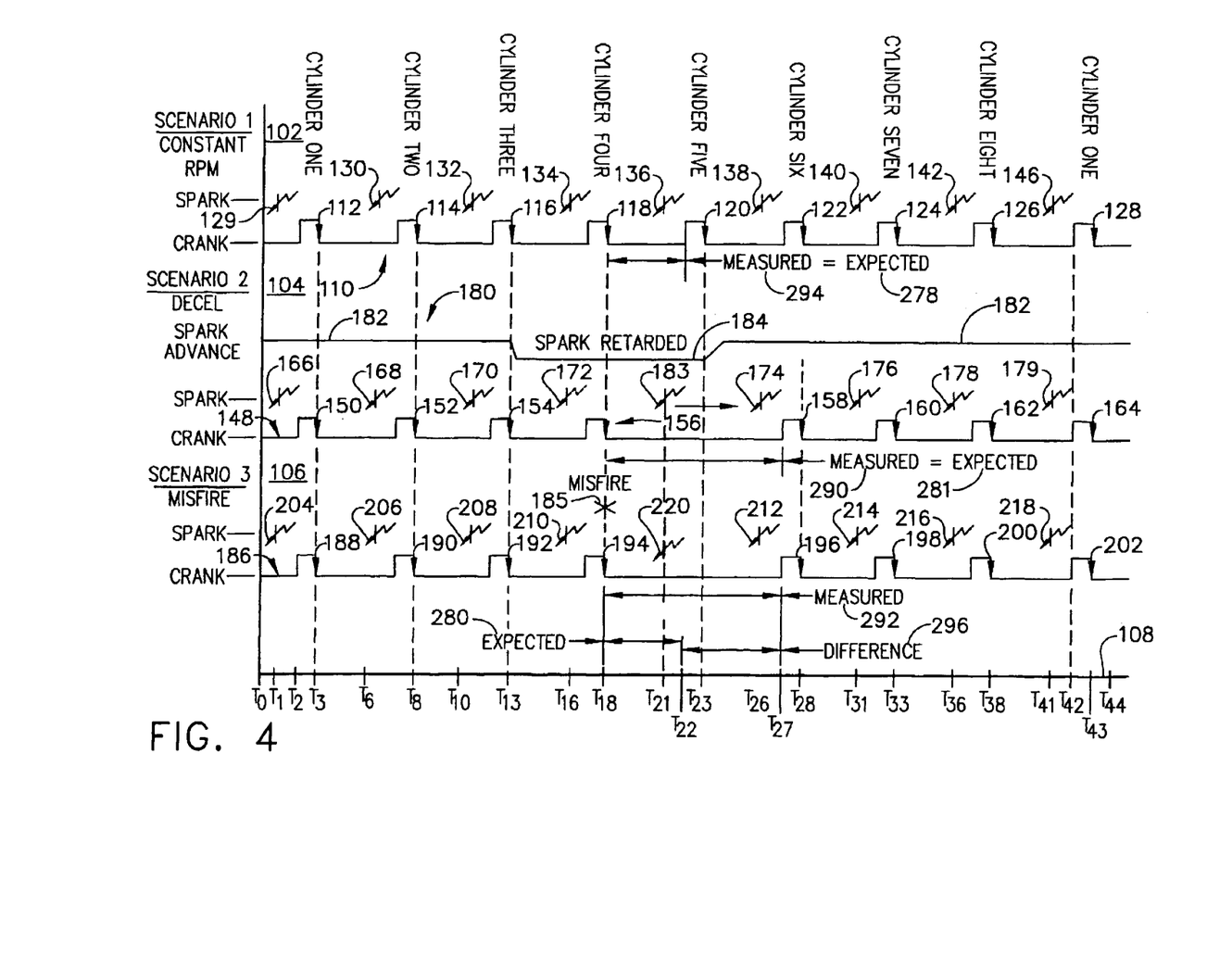
FIG. 4 is a timing diagram useful for explaining the operation of the apparatus and method of FIGS. 1 through 3.

A crank angle sensor 48 is mounted in a known manner on the crankshaft (not shown) of engine 10 and generates pulses such as those shown in FIG. 4 having a frequency corresponding to the RPM of the crankshaft. The cylinders of internal combustion engines having an even number of cylinders are typically arranged to operate in pairs. Sensor 48 helps to determine which pair of such cylinders includes a cylinder that is misfiring. Cam state sensor 50 is mounted on the camshaft (not shown) of engine 10 and helps to identify which cylinder of the pair of cylinders identified by sensor 48 is misfiring. As is well known in the art, the respective gears associated with sensors 48 and 50 and sensors 40 through 50 are useful for purposes other than misfire detection such as for providing spark and fuel control and enabling the determination of the RPM of engine 10. An Electronic Control Unit (ECU) 52 responds to signals from sensors 40 through 50 in a known manner to operate injectors 22a through 22N and spark plugs 23a through 23N to precisely control the amount of fuel and spark energy supplied to each cylinder. ECU 52 is configured to provide further functionality for sensing when a cylinder misfire occurs and for identifying which of the cylinders is misfiring, as will be subsequently described in detail. Moreover, ECU 52 provides an output signal to misfire warning indicator 54 if a sufficient number of misfires occur within a predetermined time period.

Figure 2:
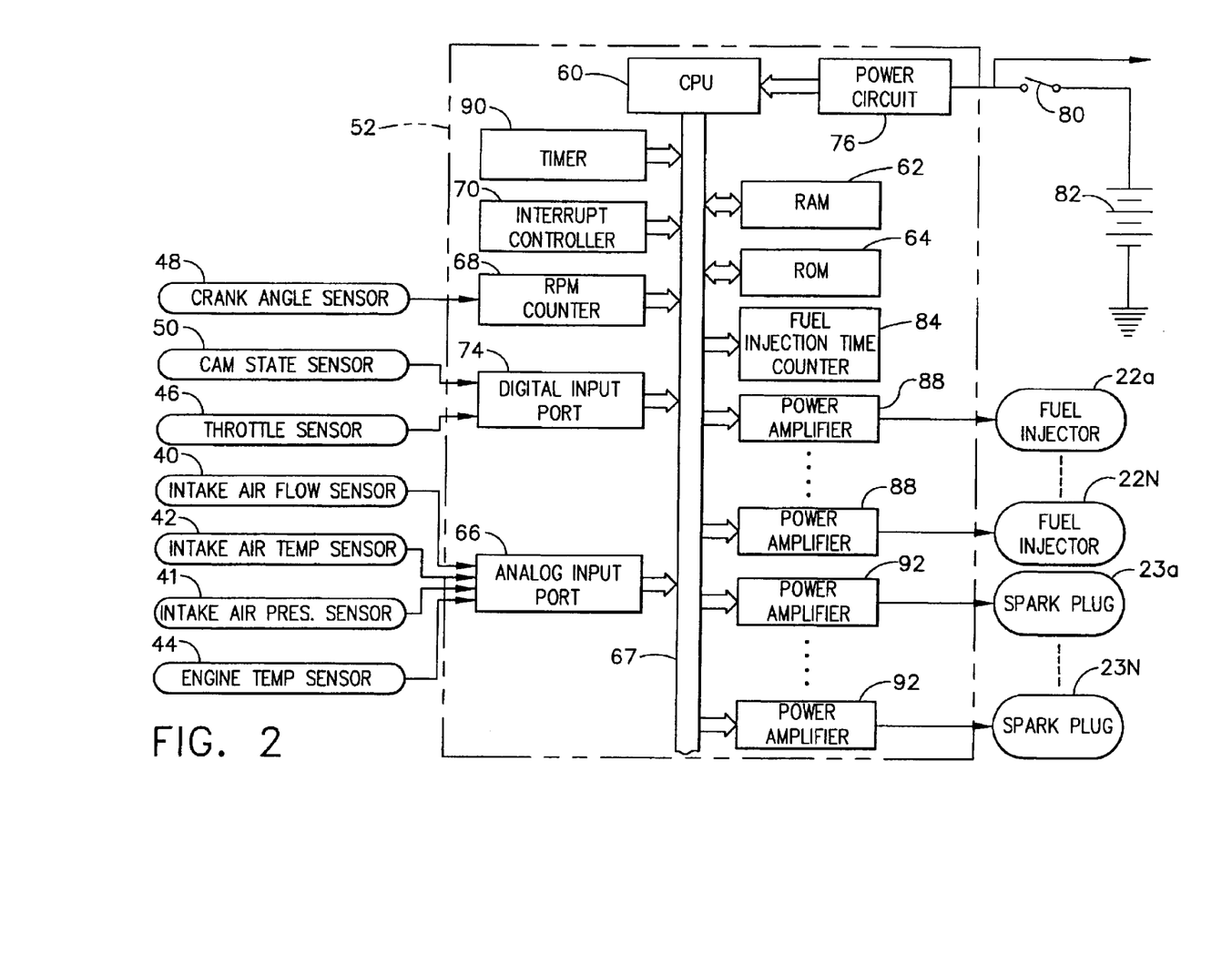
FIG. 2 is a block diagram showing major parts of the misfire sensing apparatus of FIG. 1.

More specifically, FIG. 2 illustrates ECU 52 in block form. ECU 52 is microprocessor based and includes various logic units such as the Central Processing Unit (CPU) 60 and memories such as RAM 62 and ROM 64. CPU 60 calculates and controls in a known manner the timing and the amount of fuel injected by fuel injectors 22a through 22N and the timing and the amount of spark energy and the timing of such energy from plugs 23a through 23N provided to each of the respective cylinders of engine 10. CPU 60 also performs misfire determinations in accordance with the present invention. RAM 62 temporarily stores data calculated by CPU 60 and ROM 64 stores the software programs executed by CPU 60 and as well as information such as reference values to be used in calculations by CPU 60.

ECU 52 operates in response to a plurality of inputs. These inputs include the outputs of sensors such as sensors 40, 41, 42, 44, 46, 48 and 50. ECU 52 includes an Analog-to-Digital (A-to-D) converter and multiplexer 66 which transforms the analog outputs of sensors 40, 41, 42 and 44 connected thereto into digital signals which are sent on a common bus 67 to be processed by CPU 60. Based on the output pulse signal from crank angle sensor 48, a rotational number counter 68 measures the time periods between predetermined crank angles of the crankshaft and generates a corresponding output signal upon the termination of each measurement. An interrupt controller 70 is responsive to an output signal from counter 68 to generate an interrupt signal which is sent to CPU 60 via common bus 67. As a result, CPU 60 executes interrupt routines for performing the calculations for fuel injection and spark which are also used with other data in accordance with an embodiment of the present invention to determine misfire. Digital input port 74 serves to transmit digital signals from sensors 46 and 50 to CPU 60 via the common bus 67. CPU 60 is connected through power control circuit 76 and key switch 80 to battery 82. CPU 60 is energized through circuit 76 in response to the closure of switch 80.

A fuel injection timer 84 can have a down counter which includes a register for converting the digital signals representative of the opening times and hence the fuel injection amounts of the respective fuel injectors 22a through 22N into pulse signals (not shown). Such pulse signals have pulse widths corresponding to the actual opening or operating times of the fuel injectors. A first plurality of power amplifiers 88 corresponding to the fuel injectors 22a through 22N are connected to CPU 60 via common bus 67. Amplifiers 88 amplify selected output signals from CPU 60 and supply the amplified outputs to control respective fuel injectors 22a through 22N. Timer 90 measures the length of elapsed times and supplies the results to CPU 60 along bus 67. A second plurality of power amplifiers 92 supply amplified signals from CPU 60 to spark plugs 23a through 23N.

Figure 3A:
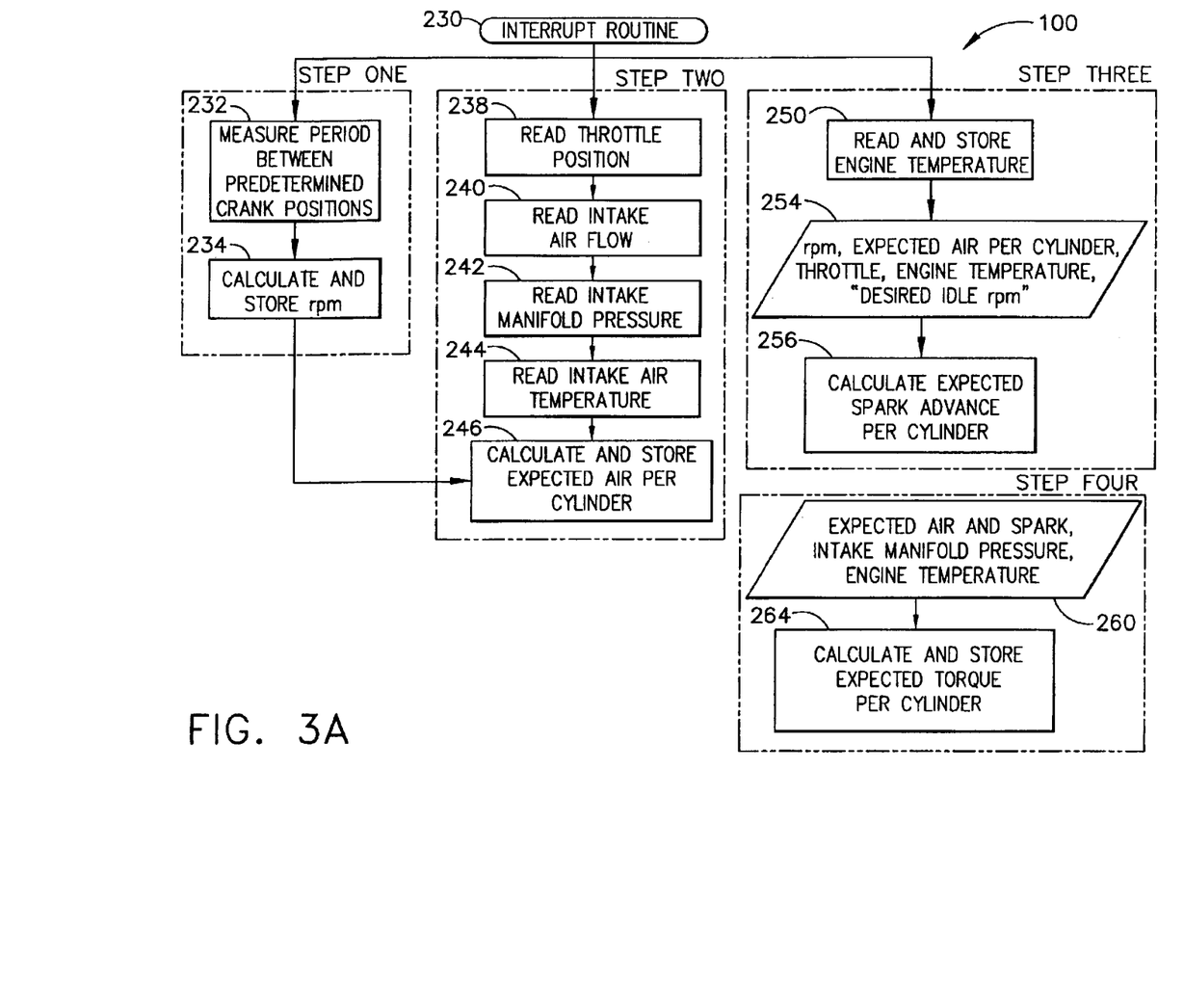
FIGS. 3A and 3B provide a flow chart of a software program showing a method of operation for the apparatus of FIGS. 1 and 2 in accordance with another exemplary embodiment of the present invention.
Figure 3B:
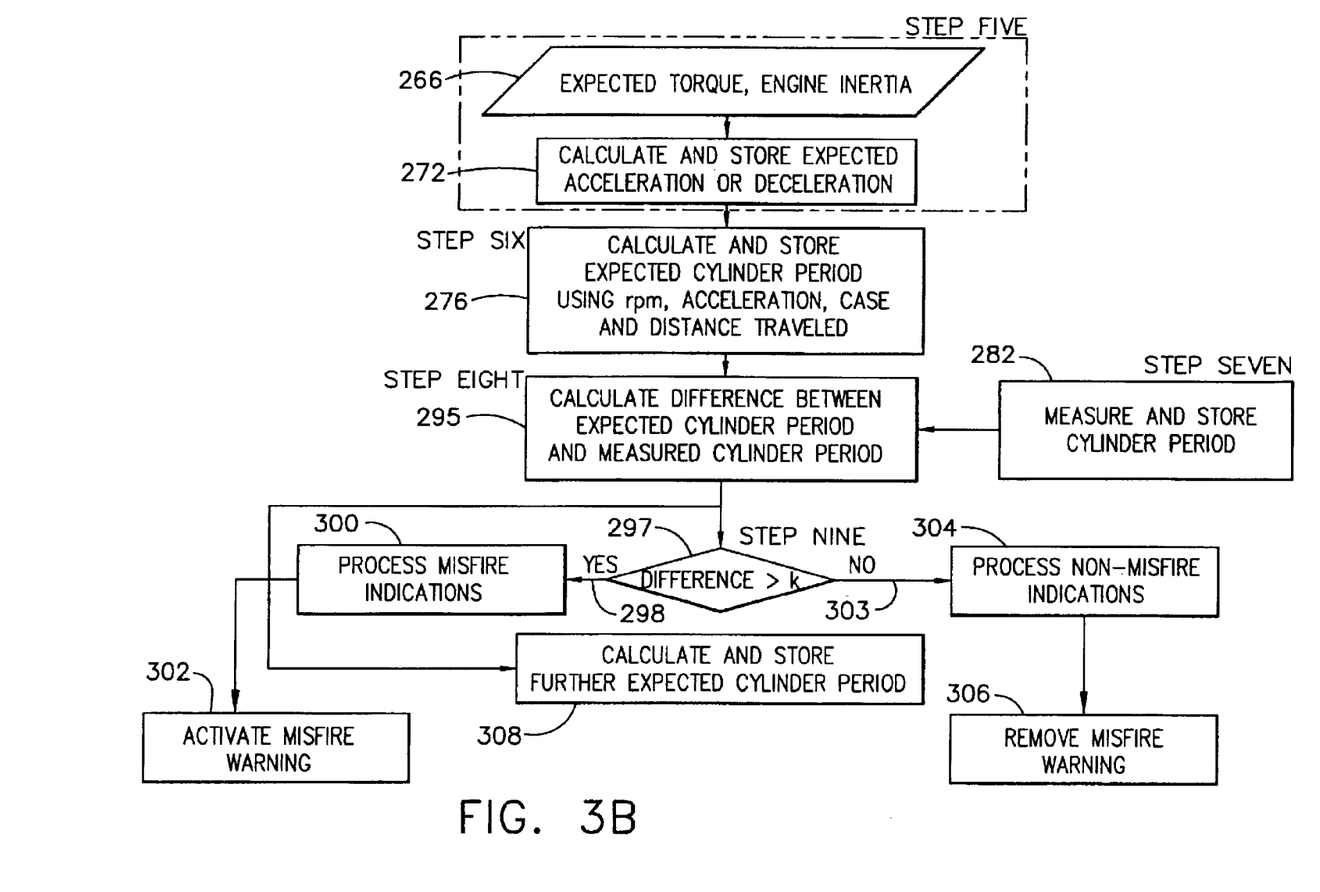

ECU 52 preferably performs the method 100 of FIGS. 3A and 3B. However, a combination of any number of electronic controllers can perform method 100. The flow chart of FIGS. 3A and 3B and the timing diagrams of FIG. 4 illustrate method 100 as will be explained in accordance with an exemplary embodiment of the present invention. More specifically, FIG. 4 includes an abscissa axis 108 for measuring times between T0 and T44. Timing diagram 102 illustrates a first scenario (SCENARIO 1) for a normal non-misfiring mode for engine 10 operating at a steady state RPM. Waveform 110 of diagram 102 indicates a simplified version of selected evenly spaced pulses or outputs 112 through 128 of crank angle sensor 48 of FIGS. 1 and 2 between times T0 and T44. Sensor 48 operates with a gear (not shown) that can have a plurality of teeth such as sixty teeth for example. These teeth are allocated in a known manner into various sets corresponding to some of the various functions of ECU 52 such as one set being allocated for spark advance, another set for fuel injector operation and still another set for misfire detection, for instance. Each pulse of waveform 110 represents a signal generated by the set of teeth designated for determining misfire for a particular cylinder. Pulses 112 through 126 of diagram 102 respectively represent cylinder numbers one through eight according to their order of ignition between times T0 and T42 for one cycle of an eight-cylinder engine, for instance. Pulse 128 represents cylinder number one for the next engine cycle, which begins at time T42. The occurrences on waveform 110 indicated by timing diagram 102 between times T3 and T8 represent a "combustion cylinder event" for cylinder number two in response to ignition 129 at time T1, for example. Spark symbols 129 through 146 of timing diagram 102 illustrate when each of the various spark plugs is ignited. These ignitions are each shown to be a fixed number of degrees before a Top Dead Center (TDC) position of the associated cylinder. Crank pulses 112 through 128 correspond to the TDC positions of each of the various cylinders for instance. The equal spacing of spark symbols 129 through 146 indicate that engine 10 is being run at a constant RPM with no misfires occurring and that the amount of spark advance is constant.

Timing diagram 104 illustrates a second scenario (SCENARIO 2) which again is for a normal non-misfiring mode for engine 10 again operating at a non-steady state RPM but which decelerates between times T18 and T28. Waveform 148 also indicates a simplified version of the resulting unequally spaced pulses or outputs 150 through 164 of crank angle sensor 48 of FIGS. 1 and 2. Pulses 150 through 164 respectively represent cylinders number one through cylinder number eight of an engine cycle according to their order of ignition between times T0 and T42. Solid line spark symbols 166 through 183 illustrate when each of the various spark plugs is ignited. Graph 180 indicates a changing spark advance value that begins and stays at level 182 until approximately time, T13 at which time the spark timing is intentionally retarded as indicated by graph 180 descending to level 184 in response to a decelerate signal (not shown) from ECU 52. Consequently, spark 183 for cylinder number five occurs at time, T21 which is delayed from the time, T16 corresponds to dashed line phantom spark 172. This is because the decelerate signal was provided by ECU 52 in response, for example, to the operator of engine 10 reducing pressure on an accelerator pedal (not shown) at a time slightly before time, T13 when spark advance is calculated for cylinder number four. This resulted in the non-occurring or phantom spark 172 otherwise occurring at time, T16 being retarded until time T21 as indicated by spark 183. The amount of torque produced by a given cylinder combustion event is inversely proportional to the time period of such event. As a result the time period between T18 and T27 which is between pulses 156 and 158 is increased during the normal operation of engine 10 so that engine 10 provides less torque and decelerates as intended. The spark advance 180 begins to increase at time, T28 as indicated by graph 180 starting to return to level 182.

Timing diagram 106 illustrates a third scenario (SCENARIO 3) which is for an abnormal misfiring mode of engine 10 which again is intended to be operating at a steady state RPM but which misfires at time, T18 as indicated by symbol 185. Waveform 186 indicates the resulting unequally spaced pulses or outputs 188 through 202 of crank angle sensor 48 of FIGS. 1 and 2. Pulses 188 through 202 are respectively associated with cylinder numbers one through eight according to their order of ignition between times T0 and T42. Solid line spark symbols 204 through 218 depict when each of the various spark plugs is ignited. Spark advance is constant between times T0 and T44 for SCE- NARIO 3. Spark 212 occurs at time, T26 which is delayed from the time, T21 of phantom or non-occurring spark 220 because of misfire 185. The time period between T18 and T27 between respective pulses 194 and 196 is undesirably increased due to this abnormal operation of engine 10 caused by misfire 185. The amount of torque provided by cylinder number four is thus undesirably reduced as a result of misfire 185 as compared to the amounts of the torque components being contributed by the other properly firing cylinders.

It is necessary to distinguish between the increased combustion cylinder event time periods between T18 and T27 of respective SCENARIOS 2 and 3 for the above described cylinder events of cylinder number four. In accordance with an embodiment of the invention, method 100 of FIGS. 3A and B employs ECU 52 to make this distinction by using data already being generated to control the air-to-fuel mixture and the spark advance for engine 10. This data is used to calculate an Expected Torque from which an Expected Cylinder Period for the combustion event for each of the cylinders is obtained. This Expected Cylinder Period is compared to the actual Measured Cylinder Period for each cylinder combustion event. If the Difference between the Expected and Measured Cylinder Periods exceeds a selected Threshold Time then a misfire indication signal is generated. If a sufficient number of such indication signals occur in a predetermined time period then a misfire warning signal results which activates the misfire warning light or other misfire warning indicator 54.

More specifically referring to method 100 of FIG. 3A, ECU 52 selects a time slot for each cylinder combustion event during which ECU 52 interrupts 230 it's routine to determine whether there has been a misfire of each cylinder. For purposes of illustration the following discussion begins by addressing the calculation of the Expected Cylinder Period for the cylinder combustion event of cylinder number four. This calculation is assumed to occur during the time period for the cylinder combustion event of cylinder number three which is between times T13 and T18 of FIG. 4 that precedes the cylinder combustion event for cylinder number four. This Expected Cylinder Period for cylinder number four could be calculated during the next time period of the cylinder combustion event itself for cylinder number four or during some other time period. The data in support of the calculation must be retrieved and stored when such data is available and but such data can then used to perform calculations at a later time. In STEP ONE of FIG. 3A the period between the crank pulses beginning at times T13 and T18 is measured 232 and the corresponding RPM (rpm) is calculated and stored 234 in RAM 62.

STEP TWO determines the EXPECTED AIR mass PER CYLINDER. The THROTTLE POSITION can be read 238 from sensor 46 to determine transient conditions. Under such transient conditions the determination of EXPECTED AIR is made using Boyle's Equation PV=nRT wherein the EXPECTED AIR is proportional to the number of molecules, n. R is the universal gas constant. The Volume, V is approximately a constant for a given engine at a constant rpm. The INTAKE AIR FLOW is read 240 from sensor 40 to provide an approximation of the air mass/time. The INTAKE MANIFOLD PRESSURE, P is read 242 from sensor 41 and the INTAKE AIR TEMPERATURE, T is read 244 from sensor 42. These readings along with the previously stored rpm are used in a known manner to calculate a stored 246 value for the EXPECTED AIR. Alternatively, if engine 10 is operating at a steady state condition then the EXPECTED AIR is based primarily on the air flow measurement of sensor 40. These calculations are performed by ECU 52.

STEP THREE includes reading the ENGINE TEMPERATURE from sensor 44 and storing this data 250. Next, the rpm, EXPECTED AIR per cylinder and THROTTLE POSITION are retrieved 254 from their data storage in memory such as RAM 62 and then used to calculate and store 256 the EXPECTED SPARK advance for cylinder number four. If the engine is in its idle mode of operation then the DESIRED LIE rpm is retrieved from ROM 64 and also used 254 in the calculation for the EXPECTED SPARK advance per cylinder.

In STEP FOUR the EXPECTED AIR, EXPECTED SPARK, INTAKE MANIFOLD PRESSURE and ENGINE TEMPERATURE are retrieved 260 from memory and used to calculate and store 264 the EXPECTED TORQUE for cylinder number four. Thus, the EXPECTED TORQUE is also calculated on a cylinder-by-cylinder basis. Since the EXPECTED AIR and EXPECTED SPARK are already available for other purposes to ECU 52 on a per cylinder basis, the invention utilizes information being provided for other purposes rather than requiring additional expensive hardware to determine misfire.

In STEP FIVE of FIG. 3B the ENGINE INERTIA which is also determined for other purposes is either read 266 from its data store such as from RAM 62 or calculated in a known manner. This data along with the EXPECTED TORQUE are used to calculate and store 272 the EXPECTED ACCELERATION or DECELERATION in a known manner using the principle that force is equal to mass multiplied by angular acceleration.

In STEP SIX the DISTANCE TRAVELED and the previously mentioned Crank Angle Sensing Error (CASE) are read from their data stores. The EXPECTED ACCELERATION or DECELERATION, the rpm, CASE and the DISTANCE TRAVELED are then used to calculate and store 276 the EXPECTED CYLINDER PERIOD for the combustion cylinder event for cylinder number four. As shown if FIG. 4 this cylinder combustion event time period occurs immediately after time, T18 for each of the previously described three SCENARIOS. The respective EXPECTED TIME PERIODS 278 and 280 for SCENARIOS 1 and 3 and are equal to each other as shown in FIG. 4. In contrast, the EXPECTED TIME PERIOD 281 for SCENARIO 2 is longer than for scenarios 1 and 3.

In STEP SEVEN the period of the cylinder combustion event for cylinder number four is read and used to generate an actual MEASURED CYLINDER PERIOD which is stored 282. STEP SEVEN of FIG. 3B. The measurement can start at time T18 and finish at T29. As shown in FIG. 4 the respective MEASURED CYLINDER PERIODS 290 and 292 for SCENARIOS 2 and 3 occur between times T18 and T27 and are equal to each other. In contrast, the shorter MEASURED CYLINDER PERIOD 294 for SCENARIO 1 occurs between times T18 and T22.

In STEP EIGHT the DIFFERENCE is calculated 295 between the corresponding MEASURED and the EXPECTED CYLINDER PERIODS. This difference is substantially zero for SCENARIOS 1 and 2 because the MEASURED and the EXPECTED CYLINDER PERIODS are nearly identical. In SCENARIO 3 however the DIFFERENCE 296 is substantial.

In STEP NINE of FIG. 3B the DIFFERENCE is compared 297 to a predetermined THRESHOLD TIME which is equal to k. If the DIFFERENCE is greater than k 298 then a misfire indication signal is created (not shown). The use of the EXPECTED CYLINDER PERIOD enables the provision of misfire indication signals with improved signal-tonoise ratios and therefore the misfire indication signals are provided with grater confidence than if the EXPECTED CYLINDER PERIOD had not been determined. Such signals are processed 300 and if a sufficient number of them occur in a selected time period then MISFIRE WARNING device 54 is activated 302. If the DIFFERENCE is less than k 303, then non-misfire indication signals (not shown) are created which also have improved signal-to-noise ratios and therefore are likewise provided with greater confidence than if the EXPECTED CYLINDER PERIOD had not been determined. These non-misfire indication signals are processed 304 to determine whether a sufficient number of non-misfire signals occur over a selected time period. This determination can be used with a determination of the number of consecutive trips of an automotive vehicle during which no misfire indication signals occur, for instance. If a sufficient number of consecutive non-misfire signals occur over a sufficient number of trips, then the MISFIRE WARNING 302 can be removed 306. A FURTHER EXPECTED CYLINDER PERIOD for cylinder number five can be calculated 308 at any of a number of selected times such as before the DIFFERENCE is calculated in STEP NINE. The FURTHER EXPECTED CYLINDER PERIOD is compared to an actual measured period for the combustion cylinder event for cylinder number five to check cylinder number five for misfires in accordance with the previously described method, and so on for all of the other cylinders.

In view of the foregoing, it should be appreciated that there have been provided misfire detection methods and apparatus in accordance with the present invention that generate misfire indication signals with improved signal-to-noise ratios. Such methods and apparatus enable the sensitivity tolerances of such misfire systems to be kept within manageable limits. Otherwise, an unacceptable number of newly manufactured engines will not pass the test procedures relating to detection of misfiring, for example. Moreover, such misfire indication signals with improved signal-to-noise ratios create increased confidence that false warning alerts are not being provided to the operators of such engines. Such methods and apparatus robustly detect cylinder misfire over both large and transient variations of RPM. Such improvements are partly accomplished by using information already being provided by ECU 52 for other purposes and thus don't require that additional expensive hardware be provided. Moreover, because of the improved signal-to-noise ratio such methods and apparatus are suitable for use with engines having large numbers of cylinders. Furthermore, such methods and apparatus are suitable for use at the engine idle mode.

While exemplary embodiments have been presented in the foregoing detailed description it should be appreciated that a vast number of variations exist. It should also be appreciated that these exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the spirit and scope of the invention as set forth in the appended claims.

What is claimed is:

1. An apparatus for sensing a misfire in an internal combustion engine and for providing a misfire indication signal in response to the occurrence of the misfire, the apparatus comprising:

at least one cylinder of the internal combustion engine, said cylinder having a cylinder event during which fuel is combusted in said cylinder, said cylinder delivering a certain magnitude of torque during said cylinder event, said cylinder event having a time period that is inversely proportional to said magnitude of said torque; said cylinder being capable of a misfire during said cylinder event thereof and consequently providing torque of a reduced magnitude during said misfire cylinder event as a result of said misfire; and an electronic controller that is configured to:
calculate an expected time period for a cylinder event to provide an expected time period value;
measure the actual time period of said cylinder event to provide a measured time period value; and
calculate the difference between said expected time period value and said measured time period value to provide a difference time period value;
compare said difference time period value to a predetermined threshold time; and
provide the misfire indication signal in response to said difference time period value exceeding said predetermined threshold time.

2. The apparatus of claim 1 wherein said electronic controller is configured to remove the misfire indication signal in response to other difference time periods being less that said predetermined threshold time.

3. The apparatus of claim 1 wherein:
said calculation of said expected time period value occurs during a selected cylinder event that precedes a next cylinder event; and
said measurement of said measured time value occurs during said next cylinder event.

4. The apparatus of claim 3 wherein said calculation of said difference time period and said comparison of said difference time period value with said predetermined threshold time occur after said selected cylinder event.

5. The apparatus of claim 1 wherein said calculation of said expected time period value and said measurement of said measured time value occur during a same selected cylinder event.

6. The apparatus of claim 5 wherein said calculation of said difference time period value and said comparison of said difference time period value with said predetermined threshold time also occur during said same selected cylinder event.

7. The apparatus of claim 1 wherein said electronic controller is further configured to:
calculate an expected air mass value;
calculate an expected spark advance value;
utilize said expected spark advance value and said expected air mass value to calculate an expected torque value; and
utilize said expected torque value to calculate said expected time period value.

8. The apparatus of claim 7 further including:
a speed sensor providing a control signal representative of the speed of the engine;
an engine throttle having various possible positions;
a throttle sensor configured to provide a control signal representative of a position of said throttle;
an engine air intake manifold conducting air into the at least one cylinder of the engine;
a manifold sensor associated with said intake manifold, said manifold sensor means providing control signals representative of the mass, pressure and temperature of the air being conducted by said manifold; and wherein said speed, throttle and manifold electronic controller being responsive to selected control signals from said sensor manifold to calculate said expected air mass value.

9. The apparatus of claim 7 further including:

a speed sensor providing a control signal representative of the speed of the engine;

an engine throttle having various possible positions;

a throttle sensor providing a control signal representative of a position of said throttle;

a temperature sensor providing a control signal representative of the temperature of the engine; and wherein said electronic controller being responsive to selected control signals from said speed, throttle and temperature sensors to calculate said expected spark advance value.

10. The apparatus of claim 1 further including:

misfiring cylinder warning means coupled to receive said misfire indication signals from said electronic controller; and said warning means being responsive to said misfire indications signals to provide a misfire warning signal.

11. The apparatus of claim 10 wherein said misfiring cylinder warning requires a predetermine number of said misfire indicating signals to occur before generating said misfire warning signal.

12. The apparatus of claim 1 further including:

the engine having a plurality of cylinders;

misfiring cylinder identification means coupled to said electronic controller; and said misfiring cylinder identification means enabling said electronic controller to identify any cylinder of said plurality of cylinders of the engine that is misfiring.

13. The apparatus of claim 12 wherein the internal combustion engine has an even number of cylinders, the apparatus further including:

a crank shaft angle sensor providing a pulsed signal having a time period, said period being inversely proportional to the amount of torque developed during a cylinder event by a pair of cylinders, said misfire resulting in said time period being lengthened for a pair of cylinders having a misfiring cylinder;

said crank shaft angle sensor being coupled to said electronic controller, said electronic controller storing which pair of cylinders is misfiring; and a cam state sensor coupled to said electronic controller, said cam state sensor enabling said electronic controller to identify which cylinder of said pair of cylinders is misfiring.

14. A method for sensing a misfire in a cylinder of an engine having at least one cylinder and for providing a misfire indication signal in response to the misfire, the method comprising the steps of:

calculating an expected time period for a cylinder event during which fuel is combusted in the cylinder to provide an expected time period value;

measuring the time period of said cylinder event to provide a measured time period value; and calculating the difference between said expected time period value and said measured time period value to provide a difference time period value;

comparing said difference time period value to a predetermined threshold time; and providing a misfire indication signal in response to said difference time period value exceeding said predetermined threshold time.

15. The method of claim 14 further including the step of removing the misfire indication signal in response to other difference time periods being less than said predetermined threshold time.

16. The method of claim 14 wherein:

said step of calculating said expected time period value occurs during a selected cylinder event that precedes a next cylinder event; and said step of measuring said measured time value occurs during said next cylinder event.

17. The method of claim 16 wherein said step of calculating said difference time period and said comparison of said difference time period to said predetermined threshold time also occur after said selected cylinder event.

18. The method of claim 14 further including the steps of:

calculating an expected air mass value;

calculating an expected spark advance value;

utilizing said expected spark advance and air mass values to calculate an expected torque value; and utilizing said expected torque value to calculate said expected time period value.

19. The method of claim 14 further including the step of providing a misfiring warning signal to an operator of the engine in response to the occurrence of a predetermined number of the misfire indicating signals.

20. The method of claim 14 wherein the engine has a plurality of cylinders and further including the step of identifying any cylinder or cylinders of said plurality of cylinders of the engine that is misfiring.

21. The method of claim 20 wherein the engine has an even number of cylinders, further including the steps of:

providing a pulsed signal having a period indicative of engine crank shaft positions, said period being inversely proportional to the amount of torque developed during a cylinder event by a pair of cylinders, said misfire resulting in said time period being lengthened for a pair of cylinders having a misfiring cylinder;

identifying a pair of cylinders which produce an expected cylinder event time period of sufficient length to indicate a misfire; and identifying which cylinder of said pair of cylinders is misfiring.

* * * * *